United States Patent [19]

Makinen

[11] Patent Number: 5,493,701
[45] Date of Patent: Feb. 20, 1996

[54] FREQUENCY-MODULATED TRANSCEIVER HAVING A THIRD MIXER FOR GENERATING AN OUTERMEDIATE-FREQUENCY LOCAL OSCILLATOR SIGNAL FROM MODULATED OUTPUT SIGNAL OF A HIGH FREQUENCY OSCILLATOR

[75] Inventor: Jarmo Makinen, Espoo, Finland

[73] Assignee: Nokia Telecommunications Oy, Espoo, Finland

[21] Appl. No.: 199,141

[22] PCT Filed: Aug. 19, 1992

[86] PCT No.: PCT/FI92/00228

§ 371 Date: Jun. 1, 1994

§ 102(e) Date: Jun. 1, 1994

[87] PCT Pub. No.: WO93/05584

PCT Pub. Date: Mar. 18, 1993

[30] Foreign Application Priority Data

Aug. 29, 1991 [FI] Finland ..................................... 914085

[51] Int. Cl.⁶ ..................................................... H04B 1/40
[52] U.S. Cl. .................. 455/86; 455/76; 370/24
[58] Field of Search ................... 455/73, 75, 76, 455/78, 83, 84, 85, 86, 87, 89, 63, 110, 205; 370/24, 32, 32.1, 36, 30

[56] References Cited

U.S. PATENT DOCUMENTS

| 4,491,969 | 1/1985 | Datta . |
| 4,520,474 | 5/1985 | Vilmur ..................................... 455/87 |
| 4,520,475 | 5/1985 | Berg ......................................... 455/76 |
| 4,633,511 | 12/1986 | Koga et al. .............................. 455/86 |

FOREIGN PATENT DOCUMENTS

| 2122456 | 1/1984 | United Kingdom . |
| 2228379 | 8/1990 | United Kingdom . |

Primary Examiner—Reinhard J. Eisenzopf
Assistant Examiner—Nguyen Vo
Attorney, Agent, or Firm—Cushman Darby & Cushman

[57] ABSTRACT

A frequency-modulated transceiver wherein the transmitter includes a frequency-modulated high frequency oscillator and the receiver includes coupled to a cascade, a high frequency mixer whose local oscillator signal is a modulated output signal from the high frequency oscillator, and an intermediate frequency mixer having an intermediate frequency local oscillator signal containing transmission modulation. A third mixer of the transceiver provides the intermediate frequency local oscillator signal from a modulated output signal of the high frequency oscillator.

7 Claims, 2 Drawing Sheets

FREQUENCY-MODULATED TRANSCEIVER HAVING A THIRD MIXER FOR GENERATING AN OUTERMEDIATE-FREQUENCY LOCAL OSCILLATOR SIGNAL FROM MODULATED OUTPUT SIGNAL OF A HIGH FREQUENCY OSCILLATOR

THE FIELD OF THE INVENTION

The invention relates to a frequency-modulated transceiver wherein the transmitter comprises a frequency-modulated high frequency oscillator, and the receiver comprises, coupled to a cascade, a high frequency mixer whose local oscillator signal is a modulated output signal from the high frequency oscillator, and an intermediate frequency mixer having an intermediate frequency local oscillator signal containing transmission modulation.

BACKGROUND OF THE INVENTION

In radio devices operating in the microwave regions (>1 GHz), such as radio links, it is advantageous to minimise the number of high frequency and microwave components, since they are the most expensive and often the most critical components in the system, For instance, in a full-duplex radio operating on a high frequency (microwaves, millimetric waves) it is very costly to manufacture separate local oscillators for the transmitter and the receiver, On the other hand, the use of the same high frequency oscillator both for the transmitter and the down-conversion section of the receiver causes certain problems, The most preferred way to generate the transmission signal is frequency modulation of the common high frequency oscillator, but in such a case the transmission modulation will be summed to the received signal as well, and it has to be somehow cancelled.

One known method for cancelling the transmission modulation from a received signal is to sum a baseband signal corresponding to the transmission modulation in an appropriate delay and phase relation to a baseband signal of the receiver, whereby the transmission modulation in the receipt signal is cancelled.

In Finnish Patent 80,549, the residual modulation is eliminated by using in the receiver a second intermediate frequency mixing stage in which local oscillator is also modulated with a transmission signal so that the transmission modulation in the received signal is cancelled in the second mixing.

There are certain drawbacks in the above-mentioned methods. In the first solution the detector of the receiver has to handle the modulations in both the receiving and transmitting directions, wherefore the required bandwidth increases and thus the selectivity of the receiver diminishes.

Furthermore, both methods have the problem of matching of the linearity of modulation and countermodulation, which makes it difficult to completely eliminate the transmission modulation from the received signal. The matter is further complicated by the fact that the properties of oscillators vary according to the ambient conditions. This problem can be mitigated to some degree by an automatic control of the compensation during operation, but this increases the complexity of the apparatus.

SUMMARY OF THE INVENTION

The above problems are avoided with a frequency-modulated transceiver as disclosed in the introductory paragraph.

The transceiver is characterised according to the invention in that it comprises a third mixer for generating the intermediate frequency local oscillator signal from a modulated output signal of the high frequency oscillator.

In the transceiver according to the invention, the receiving portion comprises at least two mixing stages. In the first mixing stage, the local oscillator signal is a transmission signal, and in the second intermediate frequency mixing stage eliminating the transmission modulation from the received signal, the local oscillator signal is produced by mixing from the transmission signal.

With the solution according to the invention, the compensation of the transmission modulation from the received signal is more efficient than in the prior art methods, because, in the apparatus of the invention, the local oscillator signal in the second mixing stage, i.e. the compensation signal, is derived from the signal to be compensated, and therefore the properties of the signals correspond well one to another. For instance, the nonlinearity of the modulation will not affect the resulting compensation.

BRIEF DESCRIPTION OF THE DRAWINGS

In the following, the invention will be described in more detail by means of illustrative embodiments with reference to the attached drawing, wherein.

DETAILED DESCRIPTION OF THE PREFERRED EMBODIMENTS OF THE INVENTION

Figure 1:
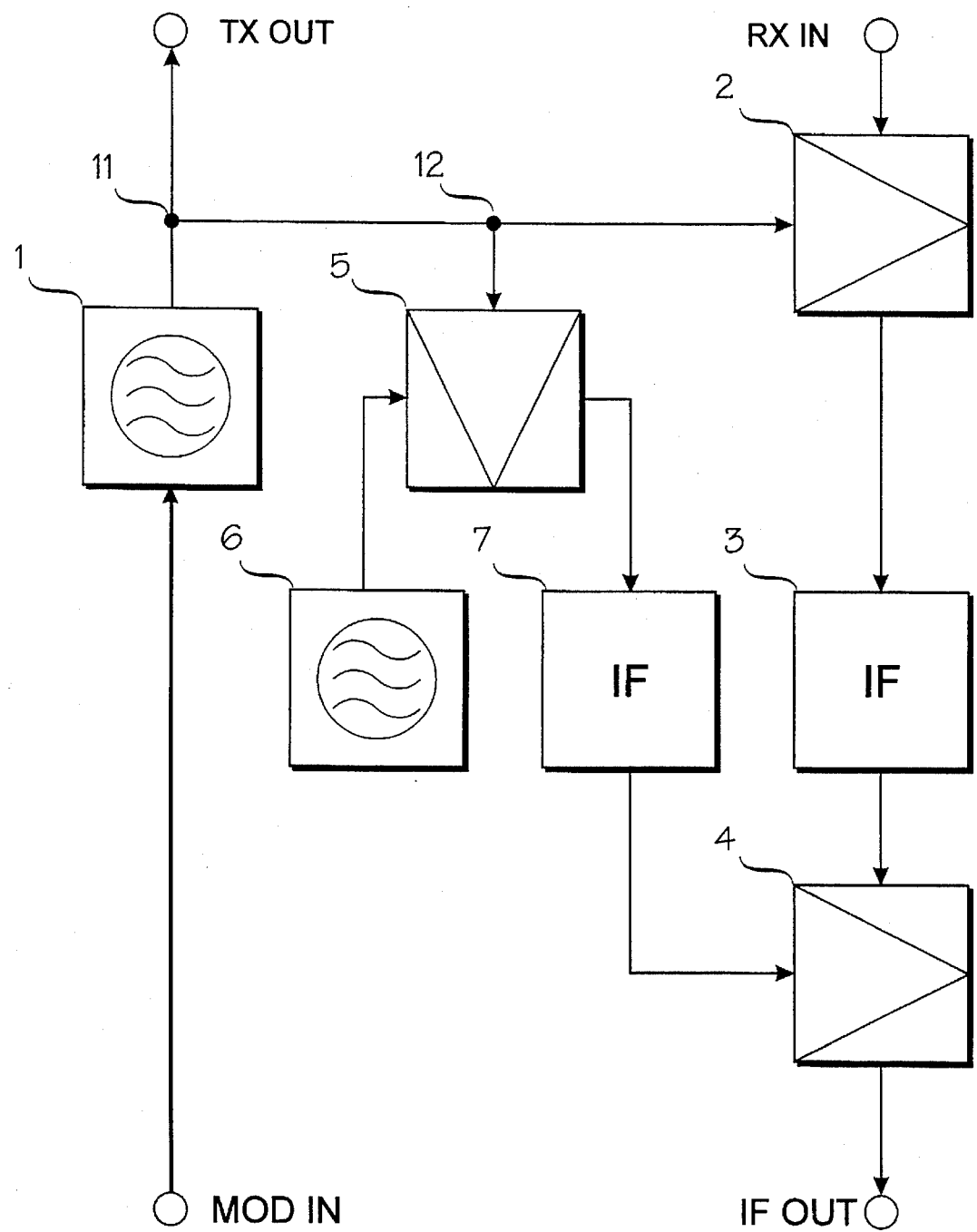
FIGS. 1 and 2 provide block diagrams of two transceivers embodying the present invention.
Figure 2:
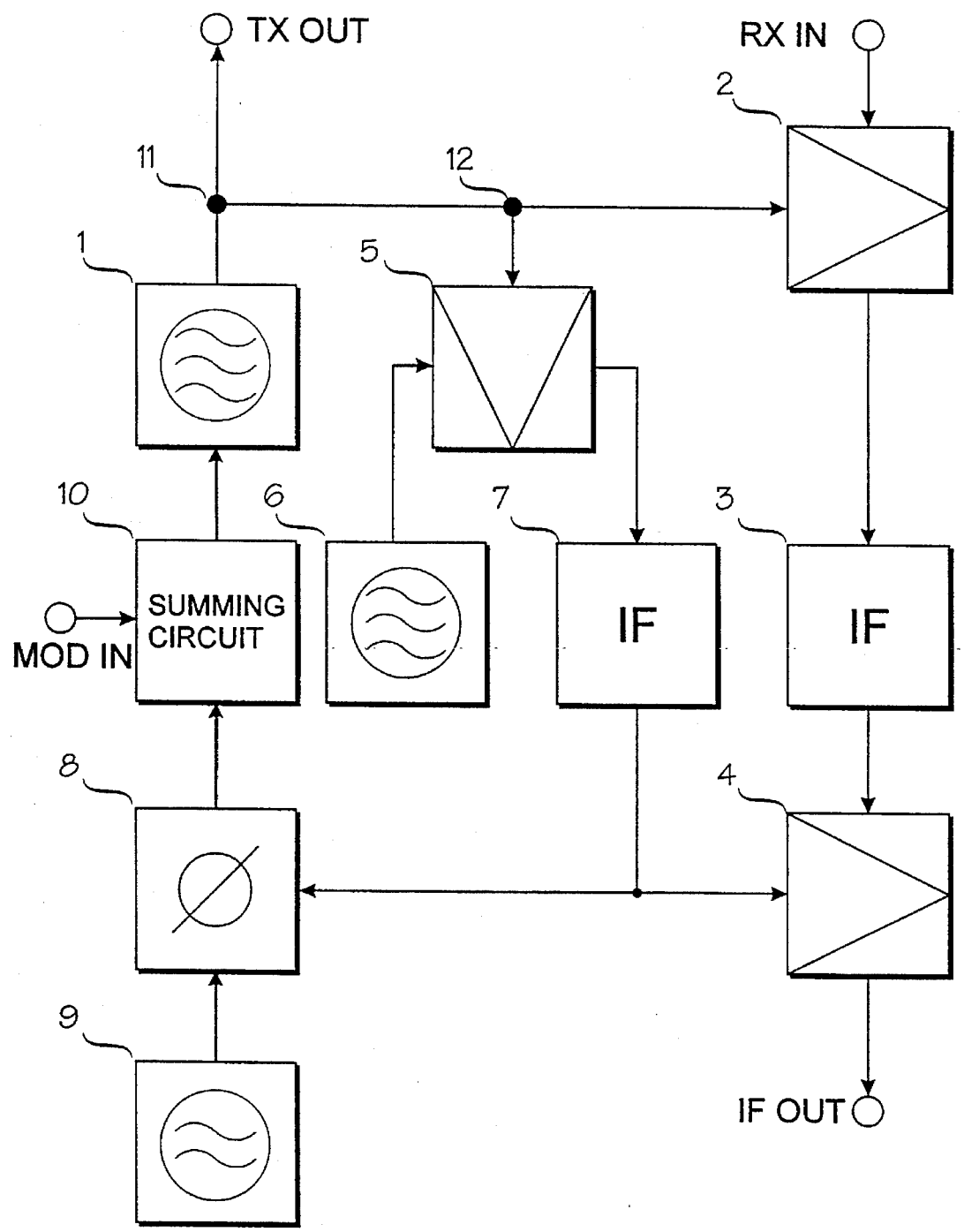

In the transceivers of FIGS. 1 and 2, the modulation signal of the transmitter is applied to the modulation input of a high frequency oscillator 1. From the output of the high frequency oscillator 1, the transmitting-frequency frequency-modulated signal is applied through branching device 11 either directly or through a possible high frequency amplifier (not shown) to an antenna. The modulation signal is preferably a digital signal. In this context, high frequency refers in particular, but not exclusively, to microwave frequencies (>1 GHz).

The receiver comprises, cascade connected in the following order, a high frequency mixer 2, an intermediate frequency section 3 (typically comprising filters and amplifiers) and an intermediate frequency mixer 4. After these, there is usually a second intermediate frequency section and a detector, which are not shown in the figures. The received signal is applied from the antenna to the mixer 2. A frequency-modulated output signal of said oscillator 1 is applied, via the branching devices 11 and 12 to the local oscillator input of the mixer 2. The mixer 2 converts the received signal into the first intermediate frequency while introducing into it the modulation content of the output signal of the oscillator 1. The intermediate frequency output signal of the mixer 2 is preferably passband filtered and amplified by the first intermediate frequency section 3 and applied to the intermediate frequency mixer 4.

The branching device 12 branches the output signal of the oscillator 1 also to the input of a mixer 5. The output of an oscillator 6 is coupled to the local oscillator input of the mixer 5. The frequency of the oscillator signal to the third mixer 5 is adjustable. The mixer 5 provides from the inputted modulated transmission signal an intermediate frequency signal, which is applied through an intermediate frequency filter 7, to the local oscillator input of the mixer 4. As a result, the local oscillator signal of the mixer 4 contains, with an equal phase, a modulation equal to that of the particular transmitter in the input signal of the mixer 4. The filtering functions of the intermediate frequency sections 3 and 7 and the directions of the mixings of the mixers 2 and 5 are selected so that the modulation caused by the particular transmitter in the received signal is compensated when the mixer 4 converts the received signal to the second intermediate frequency. Therefore, no residual modulation of the particular transmitter should occur in the output signal of the mixer 4.

The only features that make the compensation non-ideal are the linear distortion and the different delays in the intermediate frequency sections 3 and 7. Since the intermediate frequency sections 3 and 7 can, however, be fairly wideband and nearly identical with each other, no significant errors can occur impeding the compensation.

The solution according to the invention is advantageous also in that in general the mixing required for providing the compensation signal, i.e. the local oscillator signal of the mixer 4, and the oscillator signal required already exist in the transmitter in the phase locking circuit of the high frequency oscillator 1. FIG. 2 illustrates application of the invention in such a transceiver comprising a phase-locked loop. The phase-locked loop comprises a phase comparator 8, which compares the phase of the output signal of a reference oscillator 9 and the intermediate frequency filter 7, and provides an output signal representing the phase difference. In a summing device 10, a modulation signal MOD IN of the transmitter is summed to the output signal of the phase comparator 8. With the resultant summation signal, the frequency of the oscillator 1 is modulated. This embodiment of the invention has the drawback that the frequency of the signal applied from the intermediate frequency filter 7 to the phase locking circuits 8, 9 and 10 is fixed to the frequency difference between the transmitter and the receiver. The channel changeover may however be carried out by modulating the frequency of the oscillator 6.

In an alternative embodiment of the invention, the input- and local oscillator gates of the mixer 5 of FIG. 1 may be interchanged. The mixer 5 is preferably a subharmonic mixer.

The oscillator 6 can consist e.g., of a quartz oscillator and a chain of multipliers. This is an advantageous realisation, for the required signal level at the local oscillator input of the mixer 5 is fairly low. Another way to realise the oscillator 6 is to use various phase-locked loops.

The attached figures and the associated description are intended merely to illustrate the present invention. In its details, a transceiver according to the invention may vary within the scope of the attached claims.

I claim:

1. A frequency-modulated transceiver including a transmitter and a receiver, wherein:

the transmitter comprises a frequency-modulated high frequency oscillator, and the receiver comprises a high frequency mixer whose local oscillator signal is a modulated output signal from the high frequency oscillator, an intermediate frequency mixer cascade connected to the high frequency mixer and having an intermediate frequency local oscillator signal containing transmission modulation, and a third mixer for providing said intermediate frequency local oscillator signal from an output of an oscillator coupled to a local oscillator input of said third mixer, and said modulated output signal of the high frequency oscillator.

2. A transceiver according to claim 1, wherein:

an intermediate frequency filter and amplifier are coupled between the high frequency mixer and the intermediate frequency mixer.

3. A transceiver according to claim 2, wherein:

a second intermediate frequency filter and amplifier coupled between the third mixer and the intermediate frequency mixer.

4. A transceiver according to claim 1, wherein:

the third mixer is a subharmonic mixer.

5. A transceiver according to claim 1, wherein:

the frequency of the oscillator signal to the third mixer is adjustable.

6. A transceiver according to claim 1, wherein:

at least one of an intermediate frequency filter and an amplifier is coupled between the high frequency mixer and the intermediate frequency mixer.

7. A transceiver according to claim 6, wherein:

at least a second one of an intermediate frequency filter and an amplifier is coupled between the third mixer and the intermediate frequency mixer.

* * * * *